United States Patent
Shimoda et al.

(10) Patent No.: US 8,864,231 B2
(45) Date of Patent: Oct. 21, 2014

(54) BEARING ASSEMBLY FOR WORM DRIVE AND WORM GEAR FOR USE IN A SEAT SLIDING MECHANISM FOR AN AUTOMOBILE POWER SEAT

(75) Inventors: Masato Shimoda, Toin (JP); Masahiko Mizutani, Toin (JP)

(73) Assignee: NTN Corporation, Osaka (JP)

( * ) Notice: Subject to any disclaimer, the term of this patent is extended or adjusted under 35 U.S.C. 154(b) by 158 days.

(21) Appl. No.: 12/575,597

(22) Filed: Oct. 8, 2009

(65) Prior Publication Data

US 2010/0089194 A1    Apr. 15, 2010

(30) Foreign Application Priority Data

Oct. 9, 2008   (JP) ................................ 2008-263018
Oct. 1, 2009   (JP) ................................ 2009-229390

(51) Int. Cl.

| | |
|---|---|
| *F16H 57/021* | (2012.01) |
| *B60N 2/06* | (2006.01) |
| *B60N 2/44* | (2006.01) |
| *B60N 2/02* | (2006.01) |
| *F16C 33/20* | (2006.01) |
| *F16C 17/04* | (2006.01) |
| *B60N 2/12* | (2006.01) |
| *F16H 1/16* | (2006.01) |

(52) U.S. Cl.
CPC .............. *F16C 17/04* (2013.01); *F16H 57/021* (2013.01); *F16H 2057/0213* (2013.01); *B60N 2/443* (2013.01); *B60N 2/067* (2013.01); *B60N 2/0232* (2013.01); *F16H 1/16* (2013.01); *F16C 33/201* (2013.01)
USPC ........................................... 297/311; 74/425

(58) Field of Classification Search
CPC .......... F16H 2057/0213; F16H 57/021; B60N 2/067; B60N 2/443
USPC ........ 74/425, 89.14; 297/311, 344.11, 344.17
See application file for complete search history.

(56) References Cited

U.S. PATENT DOCUMENTS

| | | | | |
|---|---|---|---|---|
| 2,536,920 A | * | 1/1951 | Ducanis | ........................... 74/425 |
| 5,613,402 A | * | 3/1997 | Gauger et al. | ................... 74/425 |
| 6,332,716 B1 | * | 12/2001 | Kato et al. | ..................... 384/300 |

(Continued)

FOREIGN PATENT DOCUMENTS

| | | |
|---|---|---|
| JP | 07-268126 | 10/1995 |
| JP | 09-316323 | 12/1997 |

(Continued)

OTHER PUBLICATIONS

Japanese Office Action (and partial English translation thereof) issued May 28, 2013 in corresponding Japanese Application No. 2009-229390.

*Primary Examiner* — David M Fenstermacher
*Assistant Examiner* — Terence Boes
(74) *Attorney, Agent, or Firm* — Wenderoth, Lind & Ponack, L.L.P.

(57) ABSTRACT

A bearing assembly for a worm drive supporting the worm of the worm drive with washer-shaped thrust slide bearings and bush-shaped radial slide (sintered oil-containing bearings) bearings. The thrust slide bearings are made of a resin containing 95 to 99.9 wt % of polyetheretherketone resin, which is an aromatic polyetherketone resin. Wear of the thrust slide bearings is reduced and its durability is improved, thereby preventing vibration and noise of the worm drive as well as improving its durability.

4 Claims, 1 Drawing Sheet

(56) References Cited

U.S. PATENT DOCUMENTS

| | | |
|---|---|---|
| 6,669,371 B2 * | 12/2003 | Tanaka et al. .................. 384/279 |
| 7,340,974 B2 * | 3/2008 | Landskron et al. ............. 74/425 |
| 2005/0185867 A1 * | 8/2005 | Chu et al. ...................... 384/300 |

FOREIGN PATENT DOCUMENTS

| | | |
|---|---|---|
| JP | 2001-012473 | 1/2001 |
| JP | 2002-340109 | 11/2002 |
| JP | 2007-055527 | 3/2007 |
| JP | 2007-255458 | 10/2007 |

* cited by examiner

BEARING ASSEMBLY FOR WORM DRIVE AND WORM GEAR FOR USE IN A SEAT SLIDING MECHANISM FOR AN AUTOMOBILE POWER SEAT

BACKGROUND OF THE INVENTION

The present invention relates to a bearing assembly for a worm drive comprising thrust bearings and radial bearings supporting the rotary shaft of the worm of the worm drive, especially to a bearing assembly for a worm drive that is applicable to a seat position adjustment mechanism of an automobile power seat.

A power seat is known wherein position adjustment of each part of a reclining seat is made electrically. A seat slide mechanism of an automobile power seat comprises a seat bottom fixed through a frame on slide rails that are fixed to the floor of the vehicle, a seat back extending upward from the rear end of the seat bottom, and an electric motor mounted on the bottom of the frame for driving this frame back and forth.

The electric motor is fixed on a lower portion of the frame. To the drive shaft of this electric motor, the proximal end of a double wire comprising an inner wire and a pipe covering the inner wire in sliding contact therewith is connected. The distal end of the double wire is connected to a rotatable screw shaft through a worm drive so that driving force of the electric motor is transmitted to the screw shaft through the double wire and the worm drive.

The slide rails comprise a pair of lower rails arranged in the widthwise direction and integrally fixed on the floor and a pair of upper rails arranged in the widthwise direction over the respective lower rails and guided by the lower rails so as to be movable in the longitudinal direction. The frame is bridged between the pair of upper rails. The seat bottom is fixed on the upper rails and the frame, thereby being movable in the longitudinal direction while guided by the lower rails through the upper rails.

One of the upper rails has an inverted U-shaped cross section, in which the screw shaft extending in the longitudinal direction is mounted. The screw shaft is in threaded engagement with a nut member mounted in the lower rail so as to be rotatable relative to the nut member. Thus the upper rails can be moved back and forth with forward and reverse rotations of the nut member so as to adjust the longitudinal position of the power seat.

Thus, responding to the requirements of power- and weight-saving, the seat position adjustment mechanism of an automobile power seat is designed so that its drive shaft rotates with lower torque so as to be driven with a small motor, as well as to save weight. In such a design, the worm drive used in a seat position adjustment mechanism of an automobile power seat is required to be with lower rotational torque so as to always move smoothly with lower drive force as well as to be lightweight. This worm drive is a mechanism comprising a worm (screw gear) and a corresponding worm wheel (helical gear). It is used in a seat position adjustment mechanism of an automobile power seat since its reduction ratio in one step is large and backlash is small compared with other gear mechanisms.

For example, a bearing assembly for a worm drive wherein sintered bushes are used as radial bearings of the worm is simple in structure and lightweight compared to one wherein rolling bearings are used.

Also, weight can be saved by forming thrust bearings for the worm with a resin.

However, since load from the worm wheel works to the worm as axial load because of interlock of gears during rotation, the rotary shaft of the worm is prone to displacement in the axial direction. This makes the thrust bearings of the worm prone to wear from the received load, which may lead to vibration or noise from wear. To prevent this, wear resistance is required for the thrust bearings. Therefore, in many cases, as thrust bearings for the worm, metal rolling bearings were used which also serve as radial bearings. This prevented weight saving.

A known slide bearing 20 for a worm shown in FIG. 3 is a truncated conical member through which a bearing hole extends. It is a slide bearing serving as both thrust and radial bearings for the worm 22.

However, the above-mentioned conventional bearing 20 for a worm is pressed strongly against a tapered support hole of a bracket by spring force of a metal wave washer 21. The bearing 20 is therefore prone to wear and it is difficult to make its sliding rotation constantly smooth.

As described above, because the worm 22 meshes with the worm wheel 23, load from the worm wheel 23 is applied to the worm 22 in its axial direction. The load is thus applied to the rotary shaft of the worm 22 every time when direction or rate of rotation changes, and the slide bearing 20 for the worm is thus prone to wear. As a result, transmission efficiency is impaired and problem of vibration and noise occurs.

Also, if a rolling bearing is used as a thrust bearing in a worm bearing assembly to improve durability, weight saving requirement is not fulfilled.

The object of this invention is therefore to solve the problems described above, saving weight of a thrust bearing in a worm drive as well as reducing wear of the thrust bearing, thereby preventing deterioration of transmission efficiency and occurrence of vibration or noise, obtaining a bearing assembly for a worm drive with excellent duration, especially suitable for use in a seat sliding mechanism for an automobile power seat.

SUMMARY OF THE INVENTION

To achieve the above-mentioned object, this invention provides a bearing assembly for a worm drive comprising a worm and a worm wheel meshing with each other, the bearing assembly comprising thrust bearings and radial bearings supporting a rotary shaft of the worm, wherein the thrust bearings are thrust slide bearings made of a resin containing an aromatic polyetherketone as a main component.

From another aspect, the present invention provides a worm drive for use in a seat sliding mechanism for an automobile power seat, comprising a worm and a worm wheel meshing with each other, a bearing assembly comprising thrust bearings and radial bearings supporting a rotary shaft of the worm, wherein the thrust bearings are thrust slide bearings made of a resin containing an aromatic polyetherketone as a main component, and wherein the worm wheel has a thread groove formed on an inner periphery of a shaft hole formed in the worm wheel, and a screw shaft which is in threaded engagement with the thread groove and which is supported by slide rails of the automobile seat, the worm being connected to an electric motor, whereby torque of the electric motor is transmitted to the screw shaft through the worm drive, thereby converting the rotation of the screw shaft relative to the worm wheel to linear motion of the screw shaft, and adjusting the position of the automobile seat.

In the bearing assembly for a worm drive and the worm drive for use in a seat sliding mechanism for an automobile power seat according to the present invention configured as described above, load to axially displace the rotary shaft of the worm is received by thrust slide bearings made of a resin containing an aromatic polyetherketone resin as its main content. Wear of the thrust bearings is reduced by advantageous mechanical properties of the aromatic polyetherketone resin such as wear resistance and shock resistance. This prevents deterioration of transmission efficiency in the worm drive as well as occurrence of vibration and noise. An excellent bearing assembly for a worm gear comprising lightweight and durable thrust bearings, as well as a worm gear including such a bearing assembly and suitable for use as a seat sliding mechanism for an automobile power seat, can thus be obtained.

To reliably obtain such advantages, the resin thrust slide bearings are preferably washer-shaped bearings each having a shaft hole through which the rotary shaft of the worm extends. Also, the aromatic polyetherketone resin is preferably polyetherketone resin or polyetheretherketone resin. It is particularly preferable that the aromatic polyetherketone resin is polyetheretherketone resin, and the thrust slide bearings are made of a resin containing 95 to 99.9 wt % of polyetheretherketone.

Polyetheretherketone resin has heat resistance, shock resistance, fatigue resistance and self-lubricating property. It has also advantageous properties such as low water absorptivity and compatibility to injection molding or extrusion. Wear of the resin thrust slide bearings is thus reduced, and this prevents vibration and noise. A bearing assembly with excellent durability can thus be reliably obtained.

To further improve low frictional property, the thrust slide bearings are preferably made of a resin containing 95 to 99.9 wt % of polyetheretherketone resin and 0.1 to 5 wt % of a polytetrafluoroethylene resin. If the content of polytetrafluoroethylene resin is less than 0.1 wt %, self-lubricating property is not significantly improved compared to the case when no polytetrafluoroethylene is contained. This makes it difficult to further reduce bearing resistance of the worm drive to improve its wear resistance and consequently to improve its service life. On the other hand, even if content of polytetrafluoroethylene resin is higher than 5 wt %, it is difficult to further reduce the bearing resistance from the point that the content is 5 wt %, and practicability is impaired.

The thrust slide bearings are preferably formed by punching a sheet material that is formed by extruding a resin containing 95 to 99.9 wt % of an aromatic polyetheretherketone resin since excellent dimensional accuracy and productivity can be achieved even when using a material with relatively large mold shrinkage such as a polyetheretherketone resin.

The radial bearings for the worm are preferably sintered oil-containing bearings since weight saving, load resistance and low frictional coefficient can be achieved simultaneously. Preferably, each of two ends of the rotary shaft of the worm is supported by one of the thrust bearings and one of the radial bearings to further reduce torque during rotation of the worm.

As an example of use of the above-mentioned bearing assembly for a worm drive, it is preferable that the worm drive is a worm drive used for a seat position adjustment mechanism of an automobile power seat since torque of a small electric motor can be utilized with high transmission efficiency, as well as the advantage in durability of the bearing assembly is fully exerted.

This invention provides a bearing assembly for a worm drive wherein rotary shaft of the worm of the worm drive is supported by thrust bearings and radial bearings and wherein the thrust bearings are made of a resin containing aromatic polyetherketone as its main content. The thrust bearings of the worm are made of the resin and this makes its weight light as well as its wear reduced, thereby keeping excellent transmission efficiency. Occurrence of vibration or noise is reduced, and a bearing assembly with excellent durability is obtained.

In the arrangement in which the bearing assembly for a worm drive including thrust bearings for the worm which are made of a resin of which the major component is an aromatic polyetherketone is used for a worm drive for use in a seat sliding mechanism for an automobile power seat, the thrust bearings for the worm are lightweight, and are less likely to become worn. This makes it possible to maintain high transmission efficiency, reduce vibration and noise, and improve durability, of this worm gear.

By using polyetheretherketone resin as an aromatic polyetherketone resin, properties such as heat resistance, shock resistance, fatigue resistance, self-lubricating property, low water absorptivity and compatibility to injection molding are sufficiently improved, thereby further improving transmission efficiency of the worm drive. This reduces occurrence of vibration or noise, and a bearing assembly for a worm drive with excellent durability is reliably obtained. By using a thrust slide bearings made of resin containing a predetermined amount of polytetrafluoroethylene resin for the bearing assembly, vibration and noise are more reliably prevented since the frictional coefficient of the thrust bearing is lowered.

It is preferable that the bearing assembly for a worm drive according to the present invention is applied for a bearing assembly of a worm drive used in a seat position adjustment mechanism of an automobile power seat since torque of a small electric motor can be utilized with high transmission efficiency thereby keeping smooth movement of such a device, as well as durability is improved.

DETAILED DESCRIPTION OF THE PREFERRED EMBODIMENTS

The composition of the resin thrust slide bearing containing aromatic polyetherketone as its main component and used in this invention is explained below.

Aromatic polyether ketone used for resin thrust slide bearing is a polymer wherein benzene rings are connected linearly via ether group and ketone group, well known as a thermoplastic synthetic resin with excellent heat resistance. Typical materials include polyetheretherketone resin (PEEK).

Among other aromatic polyether ketone resins, there are polyetherketone resin (PEK) having a basic linear structure in which ether and ketone bonds are aligned alternately, polyetherketoneketone resin (PEKK), polyetheretherketoneketone resin (PEEKK), and polyetherketone-etherketoneketone resin (PEKEKK).

For such a thrust bearing comprising aromatic polyether ketone resin as main component, use of known fiber reinforcement such as glass fiber and carbon fiber as a filler is not suitable since it lowers abrasion resistance of the resin. Known fiber reinforcement contained in aromatic polyether ketone resin thrust bearing is better not be used in a worm thrust bearing of a worm drive.

Embodiments of the present invention are explained below with reference to the attached drawings.

Figure 1:
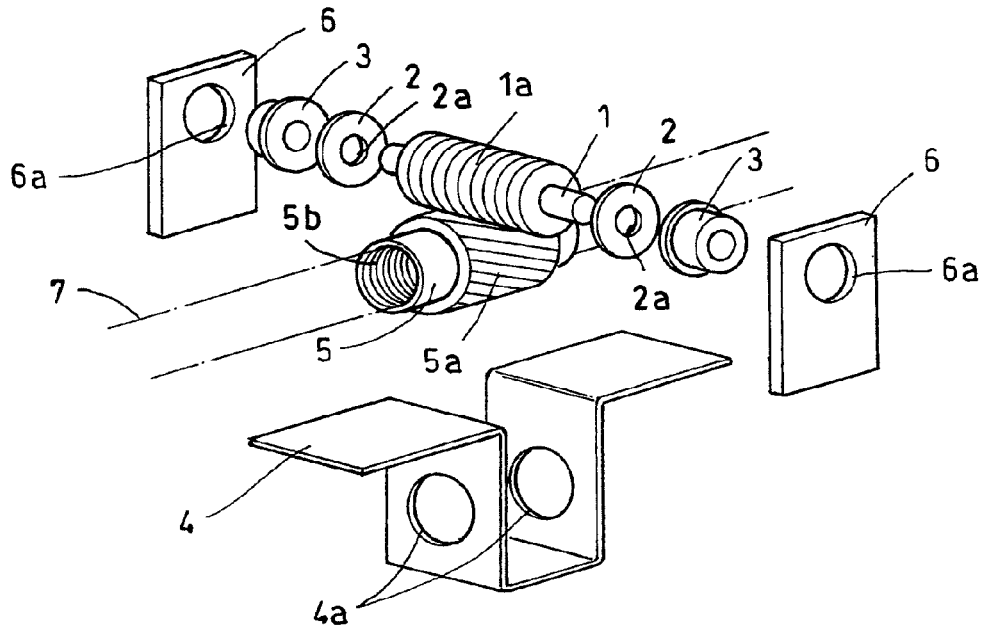
FIG. 1 is an exploded perspective view of a first embodiment.

As shown in FIG. 1, the first embodiment is a worm drive for use in a seat sliding mechanism for an automobile power seat. The worm drive includes a worm 1 supported by washer-shaped thrust slide bearings 2 having shaft holes 2a and bush-shaped radial slide bearings (sintered oil-containing bearings) 3. The thrust slide bearings 2 are made of a resin composition comprising 95 to 99.9 wt % of PEEK, which is an aromatic polyetherketone resin.

The worm 1 and the worm wheel 5 of the worm drive are provided orthogonally so that their respective gear portions 1a and 5a mesh with each other. Both ends of the shafts of the worm wheel 5 and the worm 1 are retained by plates 4 and 6 having pairs of shaft holes 4a and 6a respectively.

The bush-shaped radial slide bearings 3 are mounted in the respective shaft holes 6a, and the thrust slide bearings 2 are mounted adjacently to the respective radial slide bearings 3. Both shaft ends of the worm 1 are thus supported by the thrust slide bearings 2 and the radial slide bearings 3.

To one end of the worm 1, an output shaft of a motor or an end of a rotation cable connected thereto (not shown) is connected so that rotation power is transmitted to the worm.

The worm wheel 5, which is supported in the opposed pair of shaft holes 4a, has a thread groove 5b on the inner periphery of a shaft hole formed in the worm wheel 5. The thread groove 5b is rotatably in threaded engagement with a screw shaft 7. Thus, when the motor is rotated, the worm 1 is rotated through the rotation cable, and thus the worm wheel 5 is rotated. This rotary motion is transmitted to the screw shaft 7, which is in threaded engagement with the thread groove 5b of the worm wheel 5.

Since the screw shaft 7 is supported by slide rails of the automobile seat, the rotary motion transmitted to the screw shaft 7 is converted to linear motion of the screw shaft 7 relative to the worm wheel 5. Thus, by selectively rotating the motor in one of the forward and reverse directions, thereby rotating the worm wheel 5 in one of the forward and reverse directions, the automobile seat can be moved linearly, e.g. back and forth through the screw shaft 7 and the frame.

The worm and the worm wheel 5 are ordinarily made of a ferrous or copper material. But if the thread groove 5b formed on the worm wheel 5 is made of resin, it is possible to reduce torque when the screw shaft 7 rotates and also to reduce the weight of the worm drive.

Such a worm wheel can be formed by inserting (injection molding) a tubular resin member having the thread groove 5b into a metal body of the worm wheel 5. For higher strength, lower torque, and reduced weight, the tubular member having the thread groove 5b is preferably made of one of polyphenylene sulfide resins, aromatic polyetherketone resins, polyimide resins and polyamide resins.

Figure 2:
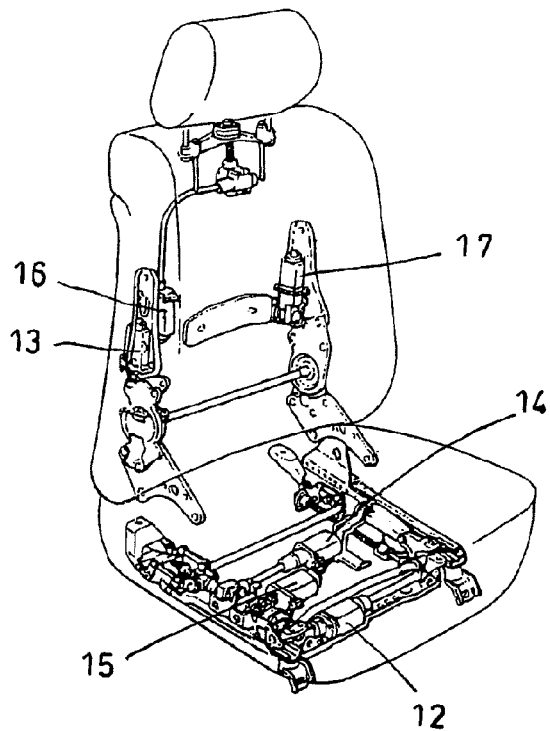
FIG. 2 is a schematic view of a position adjustment mechanism of an automobile seat.
Figure 3:
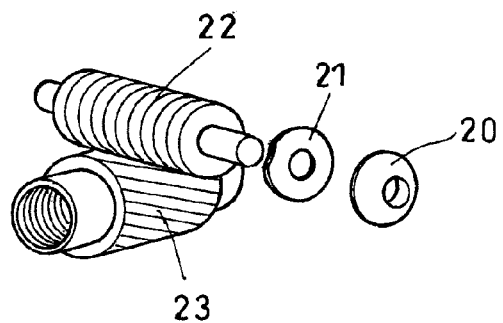
FIG. 3 is a perspective view of a conventional bearing assembly for a worm drive.

The bearing assemblies according to the first embodiment described above are attached to the predetermined positions in a seat position adjustment mechanism of an automobile power seat shown in FIG. 2, in which torque of small electric motors (seat slide motor 12, reclining motor 13, tilt motor 14, lifter motor 15, head rest motor 16 and lumber support motor 17) are efficiently transmitted to motion devices.

In this bearing assembly, force to deflect in the axial direction of the worm 1, which is inherent in a worm drive, is received by the thrust slide bearings 2, which are made of a resin containing an aromatic polyetherketone resin as main content. This reduces wear of the thrust slide bearings 2 because of advantageous mechanical properties such as abrasion resistance and shock resistance, which are inherent in the main content resin, and thus improves durability of the bearing assembly. Vibration and noise of the worm drive are reduced, and a bearing assembly with durable and lightweight thrust bearings can be obtained.

Such thrust slide bearings made of a resin of which the major component is an aromatic polyetherketone resin may also be used for supporting the worm wheel.

EXAMPLES

Examples 1 to 3 of the Invention

Slide bearings (washers) were prepared, using a bearing material (BEAREE PK5030, made by NTN Engineering Plastics Corp.) containing polyetheretherketone resin (PEEK) as a base resin, or PEEK and polytetrafluoroethylene resin (PTFE) as an additive to PEEK, according to the proportions shown in Table 1. These slide bearings were subjected to a bench test (abrasion resistance test) in which operating condition of a seat slide worm drive of a seat position adjustment mechanism in an automobile power seat is assumed. The bearings were rotated 13.5 million times at 3600 rpm with 280 N load and then the respective amounts of wear (thickness reductions of the washer-shaped slide bearings in the axial direction) were measured.

As shown in Table 1, the amounts of wear in the test were 23 to 25 μm. It is concluded that, in these slide bearings, no gap is occurred in the axial direction of the worm and thus rotation efficiency of the gears is not impaired and that vibration and noise do not occur.

In the slide bearings (washer) used in the above-mentioned test, it is recognized that transmission efficiency from the worm to the worm wheel is impaired and noise occurs because of a gap formed in the axial direction of the worm when the amount of wear (thickness reduction in the axial direction) exceeds 50 μm.

In worm drives for a seat position adjustment mechanism of an automobile power seat (see FIG. 2), the worm connected to the seat slide motor 12 is most frequently used compared to the worms connected to the reclining motor 13, the tilt motor 14, the lifter motor 15, the head rest motor 16 and the lumber support motor 17, and thus prone to wear.

TABLE 1

| | No. | | | | | |
| --- | --- | --- | --- | --- | --- | --- |
| | Examples | | | Comparative Examples | | |
| Item | 1 | 2 | 3 | 1 | 2 | 3 |
| Base resin (wt %) | PEEK (100) | PEEK (99.9) | PEEK (95) | PPS (100) | PPS (97) | Nylon 66 (100) |
| Additive (wt %) | — | PTFE (0.1) | PTFE (5) | — | PTFE (3) | — |
| Wear (μm) | 24 | 23 | 25 | 64 | 67 | 100< |

Comparative Examples 1 and 2

Slide bearings (washers) were prepared, using a bearing material (BEAREE AS, NTN Engineering Plastics Corp.) containing polyphenylene sulfide (PPS) as a base resin, or PPS and PTFE as an additive to PPS, according to the proportions shown in Table 1. These slide bearings were subjected to a bench test (abrasion resistance test) in which operating condition of a seat slide worm drive of a seat position adjustment mechanism in an automobile power seat is assumed, under the same conditions as Examples of the invention.

As shown in Table 1, amounts of wear in the test were 64 μm (Comparative Example 1) and 67 μm (Comparative Example 2). It is concluded that, in these slide bearings, a gap occurs in the axial direction of the worm, which impairs transmission efficiency of the worm drive.

Comparative Example 3

Slide bearings (washers) were prepared, using a bearing material (BEAREE NY, NTN Engineering Plastics Corp.) containing polyamide 66 (Nylon 66) as a base resin. The slide bearing were subjected to a bench test (abrasion resistance test) in which operating condition of a seat slide worm drive of a seat position adjustment mechanism in an automobile power seat is assumed, under the same conditions as Examples of the invention.

As shown in Table 1, amount of wear in the test exceeds 100 μm. It is concluded that, in this slide bearing, a gap occurs in the axial direction of the worm, which impairs transmission efficiency of the worm drive.

What is claimed is:

1. A worm drive for use in a seat sliding mechanism for an automobile power seat, comprising:
    a worm and a worm wheel meshing with each other, said worm having a rotary shaft; and
    a bearing assembly comprising thrust bearings and radial bearings supporting each of two ends of said rotary shaft of said worm, wherein said thrust bearings are thrust slide bearings which are made entirely of a resin and which are formed in a washer shape by punching a sheet material, the sheet material being formed by extruding a resin containing 100% of an aromatic polyetheretherketone resin, and in which each of said washer-shaped resin thrust slide bearings has a shaft hole through which the rotary shaft of the worm penetrates, wherein each of said radial bearings is supported by a stationary member so as to be rotatable relative to the stationary member, and wherein said radial bearings are sintered oil-containing radial slide bearings,
    wherein said worm wheel has a shaft hole formed in said worm wheel, a thread groove formed on an inner periphery of said shaft hole, and a screw shaft which is in threaded engagement with said thread groove and which is supported by slide rails of the automobile seat, said worm being connected to an electric motor, whereby torque of the electric motor is transmitted to said screw shaft through said worm and said worm wheel, thereby converting the rotation of said screw shaft relative to said worm wheel to linear motion of said screw shaft so as to adjust a position of the automobile seat.

2. The worm drive according to claim 1, wherein said worm wheel includes a metal body, and wherein said thread groove formed in said worm wheel is made of a resin integrally formed on said metal body.

3. A worm drive for use in a seat sliding mechanism for an automobile power seat, comprising:
    a worm and a worm wheel meshing with each other, said worm having a rotary shaft; and
    a bearing assembly comprising thrust bearings and radial bearings supporting each of two ends of said rotary shaft of said worm, wherein said thrust bearings are thrust slide bearings which are made entirely of a resin and which are formed in a washer shape by punching a sheet material, the sheet material being formed by extruding a resin composition comprising 95 to 99.9 wt % of an aromatic polyetherketone resin and 0.1 to 5 wt % of a polytetrafluoroethylene resin, and in which each of said washer-shaped resin thrust slide bearings has a shaft hole through which the rotary shaft of the worm penetrates, wherein each of said radial bearings is supported by a stationary member so as to be rotatable relative to the stationary member, and wherein said radial bearings are sintered oil-containing radial slide bearings,
    wherein said worm wheel has a shaft hole formed in said worm wheel, a thread groove formed on an inner periphery of said shaft hole, and a screw shaft which is in threaded engagement with said thread groove and which is supported by slide rails of the automobile seat, said worm being connected to an electric motor, whereby torque of the electric motor is transmitted to said screw shaft through said worm and said worm wheel, thereby converting the rotation of said screw shaft relative to said worm wheel to linear motion of said screw shaft so as to adjust a position of the automobile seat.

4. The worm drive according to claim 3, wherein said worm wheel includes a metal body, and wherein said thread groove formed in said worm wheel is made of a resin integrally formed on said metal body.

* * * * *